May 9, 1933.    R. HARTMANN    1,907,539
MACHINE FOR LABELING AND WRAPPING CIRCULAR AND ANGULAR ARTICLES
Filed Jan. 27, 1930    3 Sheets-Sheet 1
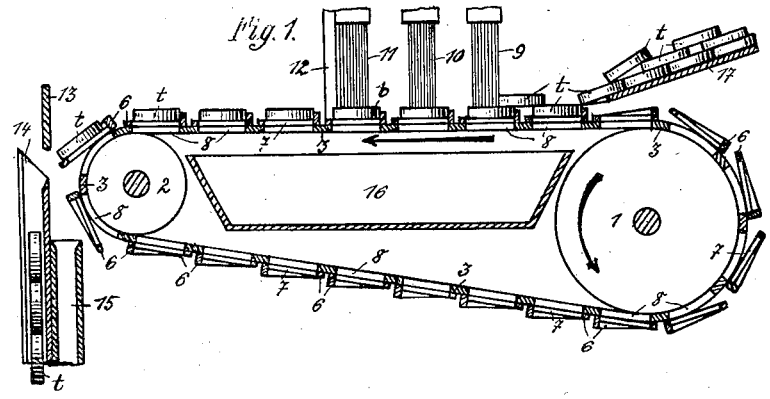
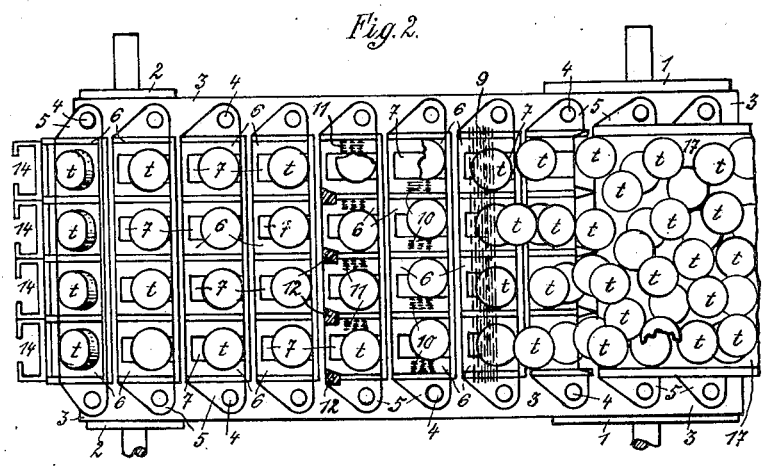
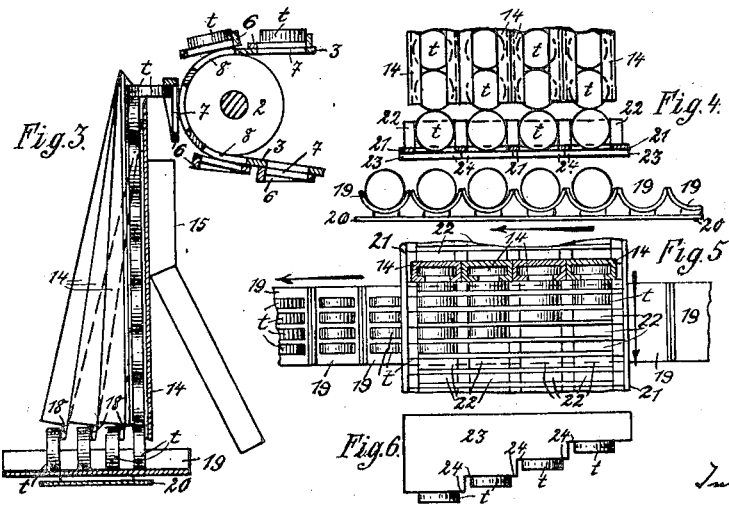

May 9, 1933.  R. HARTMANN  1,907,539
MACHINE FOR LABELING AND WRAPPING CIRCULAR AND ANGULAR ARTICLES
Filed Jan. 27, 1930  3 Sheets-Sheet 2
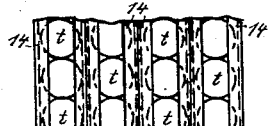
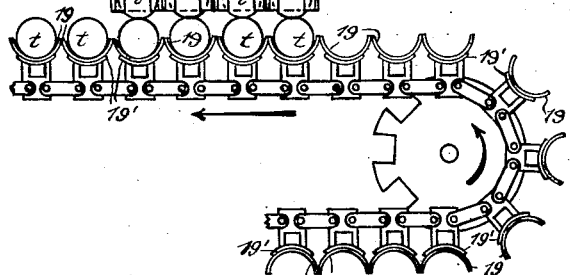
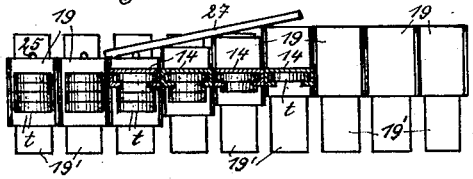
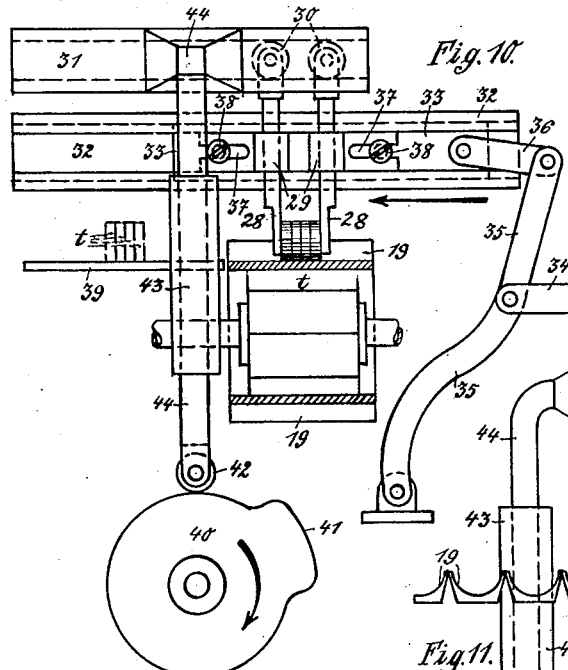
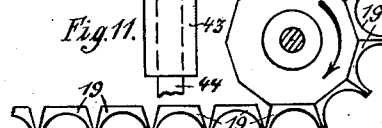

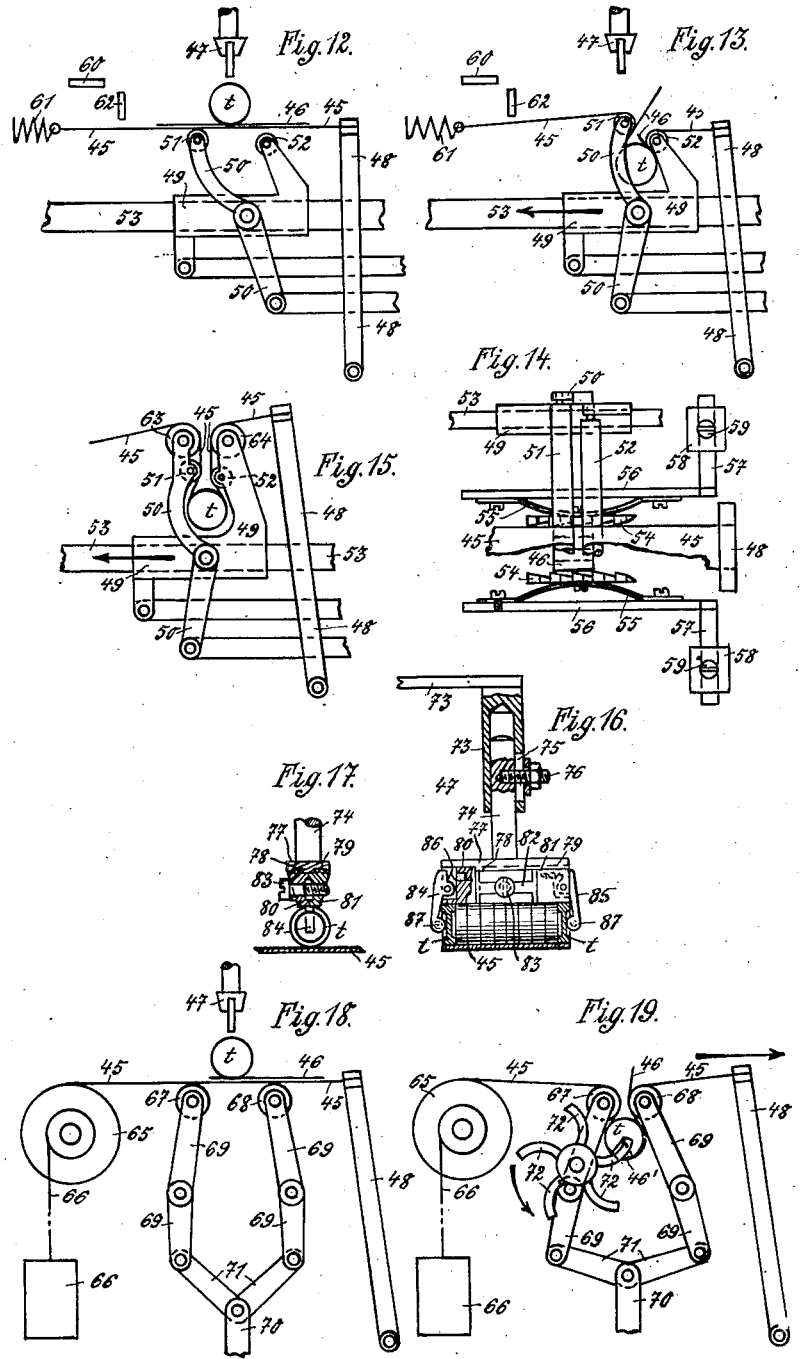

Patented May 9, 1933

1,907,539

UNITED STATES PATENT OFFICE

REINHOLD HARTMANN, OF DRESDEN, GERMANY

MACHINE FOR LABELING AND WRAPPING CIRCULAR AND ANGULAR ARTICLES

Application filed January 27, 1930, Serial No. 423,840, and in Germany April 13, 1929.

This invention relates to a machine for labeling and wrapping circular and angular articles which are taken from an irregular heap, sorted, counted and fed to the winding device, which labels and wraps the articles.

According to the invention the articles to be packed, for example tablets, are taken from an irregular storage heap, and introduced singly, in juxtaposed endless, consecutive, continually or intermittently moving frame-like elements, open at the front end, at the inclination of which elements the tablets fall into chutes for further treatment.

The frame-like elements, each of which preferably only accommodates one tablet, but may also receive any number of tablets, arranged one behind the other in the feeding direction, are arranged side by side in a number corresponding to the number of chutes for a certain number of tablets in one wrapper, and can be arranged in endless rows in any suitable manner, for example by feeding chains or feeding bands fitted with the elements, which chains or bands can be provided separately for each justaposed row of elements or for all rows together.

According to the invention the arranging, counting and feeding of the tablets and the like are carried out on travelling beds, for example on a known pocket chain, quicker and absolutely cleanly by mechanical means, in that any desired number of tablets can be placed on different points of the travelling beds simultaneously and, in the direction of the thickness of the tablets, mutually displaced by the thickness of the tablets, from any desired number of stationary chutes having delivery openings at the bottom, mutually displaced by the thickness of a tablet so that rows of certain numbers of tablets ready for packing arranged one behind the other are gradually formed during the travelling of the beds.

If the lower delivery opening of the stationary chutes are not displaced by the thickness of the tablet but stand all in one vertical plane, the tablets fall, according to the invention either into frames moved transversely to their travelling direction, which are emptied in stages equal to a thickness of a tablet, or into travelling beds, which at each moving step, or after one or more idle moving steps, are shifted transversely to their travelling direction by the thickness of a tablet.

The formation of rows, each comprising a certain number of tablets, ready for packing gradually during the travelling of their beds, suitably joined the one behind the other in chain form, enables a very quick charging of all tablet beds with goods consecutively in a row, whereas the charging of each individual bed with the full number of tablets necessary for one packing at one time requires a long time, whereby the efficiency of the packing machine dealing with the tablets is considerably decreased.

According to the invention the two feeders, which hold the tablets or the like between them, remove them from the travelling beds and bring them into the path of the wrapping device of the machine, and are mutually adjustable as regards mutual distance by any suitable means so as to be able to convey articles of any length or any number of articles in rows with the feeders. The two feeders can further be lifted out by suitable means so that, when being lifted out, the chain-like connected beds for the tablets or the like can travel thereunder independently of the movment of the feeders.

The wrapping device consists according to the invention of a wrapping band of suitable material, yieldingly held on the one hand and rigidly connected on the other hand to an oscillatable lever or the like, in conjunction with a slidable carriage carrying two guide rolls for the wrapping band, the band being held stationary, during the displacement of the carriage, by the lever which has been oscillated and the article to be wrapped, which may also be a bar of chocolate, a box, an octagonal bottle or the like, is thereby turned and the wrapper and the label are pressed tightly against and wound around the article. Inversely the two guide rolls for the wrapping band may, according to the invention, remain stationary during the wrapping operation, and the wrapping band fastened to an oscillatable lever or to a roll or the like alternately changing its direction of rotation so that the wrapping and labeling of round or angular articles can be carried out between the two guide rolls in the loop formed by the moving wrapping band.

In the first instance the lateral folding of the wrapper can be effected, during the displacement of the carriage and therefore also of the article to be wrapped, by folding cheeks, known per se, arranged according to the invention on springs and adjustable in position, and in the second instance at the rotation of the article removing at the same spot in the wrapping loop by means of folding fingers arranged on each side of said loop and moving or rotating periodically or continually.

The ram, which presses the articles with the wrapper and label placed thereunder into the wrapping loop, is according to the invention adjustable in height in or on its holder for different heights of articles. For the various lengths of the articles this ram is composed of two parts longitudinally adjustable, the arms of the ram, arranged on the two end sides of the same, are movable under spring action towards the outer side and provided with an inwardly projecting extension, in order to compensate for differences in the lengths of the articles and to obtain a sure gripping also of undercut articles with projecting edge. The movement of the lateral arms of the ram, effected under spring action, may either be an oscillation around a pin or straight lined.

An embodiment of the invention for wrapping four tablets is illustrated by way of example in the accompanying drawings in which:

Fig. 1 shows in elevation the device for arranging and feeding the tablets from the shafts.

Fig. 2 is a plan view of Fig. 1.

Fig. 3 is a detail of this device.

Figs. 4 to 6 show a device for counting the tablets and for feeding the same onto the travelling beds.

Figs. 7 to 9 show such a device in modified construction,

Fig. 10 shows in elevation the device for emptying the travelling beds.

Fig. 11 is a side elevation of Fig. 10,

Figs. 12 to 14 show a wrapping device,

Fig. 15 is a modification of Figs. 12 to 14,

Fig. 16 shows in front elevation the ram pressing the rows of tablets into the wrapping loop, Fig. 17 is a side elevation of Fig. 16.

Figs. 18 and 19 show a wrapping device of modified construction.

In Figs. 1 and 2 an endless band 3 is guided over drums 1 and 2, the drum 1 being driven in the direction of the arrow. On this endless band 3 plates 5 are secured with rivets 4 (Fig. 2) each of these plates forming four frame-like juxtaposed elements 6. These elements have in the feeding direction of the tablets t (arrow in Fig. 1) no front wall so that they are similar to scoops. Each element 6 has a discharge opening 7 in its bottom portion, which continues as a similar opening 8 of the band 3. A stripper 9 composed of bristles is arranged above the band 3, which stripper is preferably adjustable in height for adaptation to the thickness of the tablets t. Guides 10 also made of bristles are arranged on the front wall of the elements 6 in the feeding direction of the tablets and further similar guides 11 are provided on the rear wall of the elements 6, which guides are also suitably adjustable in height. On the common carrier of the guides 11 guide noses 12 are fastened. An abutment bar 13 (Fig. 1) is situated behind the drum 2 extending across the width of the band 3, and under this bar four chutes 14 are arranged with a further four chutes 15 in front of or behind the chutes 14. Under the band 3 a collector 16 is provided. The guides 10 and 11 may be also shiftable or rotatable.

The operation of the machine is as follows.

The tablets t are lying in an irregular heap on a support 17, preferably subjected to jigging motion, from which they pass into the elements 6. Any tablet t, besides the one tablet in an element 6, is retained by the stripper 9 until it finds an empty element 6 in which it enters. If fragments of tablets enter the elements 6 they are removed by dropping through the gaps 7 and 8 into the collector 16. On the other hand all tablets t in the elements 6 are first pushed upwards by the guides 10 (Fig. 2) and then downwards by the guides 11, so that the damaged tablets lose their hold on the bottom of the element 6 and tip and fall into the collector 16, whereas the perfect tablets always bear on the bottom of the elements 6 during their displacement by the guides 10 and 11, as the openings 7 are suitably dimensioned. The guide noses 12 then bring all the tablets into the centre of the width of the element 6. When the band 3 passes over the drum 2, the elements 6 with the tablets t assume an inclined position, the tablets being at first prevented from dropping by the abutment bar 13, but drop behind the same into the chutes 14, whence they reach the known pocket chain of the wrapping machine. The feeding of the tablets t by the elements 6 to the chutes 14 is effected quicker than the removal from the chutes 14 into the pocket chain in view of any possible damaged tablets or unfilled elements 6. When, as shown in Fig. 3, a chute 14 is entirely filled with tablets t, the tablet further fed thereto comes into contact with the uppermost tablet in the chute 14, tips over and falls into the chute 15 and thence into a collector. The tipping of the tablets is effected positively by the rear wall of the elements 6. If necessary, special guide plates or the like may be provided for conveying the tablets $t$ from the elements 6 into the chutes 14 and 15.

According to Fig. 3 the four tablets fall out of the four simultaneously emptied frame-like elements 6 into four stationary chutes 14, open at the front, the upper entrance openings of which being situated in the same vertical plane, whereas their lower discharge openings with the guide plates 18 arranged thereon, are each displaced to the others by one thickness of a tablet. The pockets 19 are conveyed under the chutes 14, which pockets, as shown in Fig. 4, are arranged in rows in chain form on an endless band 20, running over two rollers, not shown in the drawings, and are moved periodically in the direction of the arrow shown in Fig. 4 under the row of pockets 19. When the row of pockets 19 comes to a standstill, a tablet $t$ is delivered to each of the four pockets 19, arranged one behind the other, from the chutes 14 (Fig. 3), mutually displaced by the thickness of a tablet, so that only after the fourth stopping of the periodically travelling empty row of pockets 19, one pocket 19 has received four tablets, the following pocket three, the next two and the last of the four pockets one tablet $t$. As the row of pockets 19 continues to travel, the feeding is effected gradually with a row of four tablets in a continuous operation.

According to Figs. 4 and 6, an endless steel band 21, with frames 22 arranged in chain form in a quadruple row side by side, moves transversely to the row of pockets 19 in the direction of the right hand arrow in Fig. 5 over rollers not shown in the drawings. The inner free space of the frame 22, corresponding to the size of the tablets, extends downwardly into a gap in the band 21 so that the tablets $t$ can fall from all the frames 22 into the pockets 19 as soon as their passage is allowed by the stepped plate 23 (Fig. 6), on which the periodically travelling band 21 rests.

The device is shown in Figs. 4 and 5 in full operation so that on the left, beyond the band 21 in Fig. 5 pockets 19 filled with four tablets are already leaving. The lowermost tablet $t$ falls from all four chutes 14 into the frame 22 situated thereunder, when the band 21 is stopping, and the tablets are supported in these frames by the plate 23 up to the cut out stepped portions 24 of the plate 23 (Fig. 6), serving as discharge openings, so that they are held in their frames 22 at the progressive forward movement of the band 21. In front of the four chutes 14, according to Fig. 5, two tablets are in the first row of frames from the right to the left, three in the second row and one more tablet in each of the following rows of frames 22 so that the fourth left row of frames contains five tablets. Every foremost of these tablets $t$ has, according to Fig. 6, reached the discharge opening 24 of the plate 23 and consequently one tablet falls from each of the front frames 22, of the four rows of frames to which a tablet has been fed, the discharged tablets being displaced each by the thickness of a tablet, so that into the pocket 19 standing under the first right hand row of frames 22 the first tablet drops for forming the row of four tablets ready for packing and so, gradually increasing up to pocket 19 stopped under the last left row of frames 22, in which pocket four tablets have dropped in a row ready for packing, which row is then pushed together in a suitable manner, in order to remove the gaps between the tablets, caused by the thickness of the walls of the frames 22, which must also be done in the arrangement shown in Fig. 3.

According to Figs. 7 to 9, the chain-like united pockets 19 are each displaceable transversely to their travelling direction on an under pocket 19' with carrying block in a slot 25 and acted upon by a spring 26 (Fig. 9). This displacement takes place at every step of the pocket chain 19 by the thickness of a tablet through the guide path 27 (Fig. 8).

In the position of the device illustrated in Fig. 7, the first tablet $t$ has dropped from the first right hand chute 14 into the pocket 19, which is still empty when the pocket chain 19 is stopped. The pocket 19 standing under the last left hand chute 14 receives, owing to its greater displacement transversely to the travelling direction of the pocket chain 19, through the guide path 27 the last and fourth tablet to the three tablets already present, whereas from the first right hand chute 14 the first tablet, as already mentioned, is delivered into the pocket 19 standing stationary thereunder and not yet advanced by the guide path 27 and thus, in the travelling direction of the pocket chain 19, one more tablet falls into the pocket as it progresses each time by a thickness of a tablet until three tablets have been fed so that behind the fourth left hand chute 14 the pocket chain 19 moves away with a row of four tablets $t$ ready for packing in every pocket 19.

When the pockets 19 have been emptied, and travel on their return course again towards the chutes 14, all pockets are returned on their under pockets 19' through a second guide path arranged in the opposite direction to the guide path 27 into the initial position shown in Fig. 8 by the four right hand pockets 19 to be again filled with tablets.

The row of pockets 19, if the material of the tablets does not allow of such quick filling of the chutes 14, can be fed with tablets at every second stop. In this instance the number of chutes 14 in Fig. 3, the number of chutes 14 and frames 22 in Figs. 4 and 5 and the number of chutes 14 in Figs. 7 and 8 must be doubled. In order to fill one pocket 19 with a set of four tablets eight separate steps of the travelling row of pockets 19 are necessary.

The four tablets in the pockets 19 are then removed from the pockets by the device shown in Figs. 10 and 11 with the two feeders 28 gripping the tablets. The square shafts of the feeders are vertically displaceable in bearings 29 and carry each at the top a roller 30, both rollers running in a guide 31. Under this guide 31 a guide 32 for a slide 33 is arranged which is shiftable, through the intermediary of a lever 34 actuated by a cam disc not shown, in the direction of the arrow (Fig. 10) through lever 35 with an arm 36 hinged thereon. The bearings 29 on the slide 33 are, owing to the fastening screws 38 guided in the slots 27, adjustable so that the feeders 28 can be set for any length of the tablets t in the pockets 19, measured in longitudinal direction for the greatest distance of the articles. If the slide 33 is displaced in the direction of the arrow, the tablets t arrive in known manner on a plate 39 (Fig. 10 dotted lines) and moved from this plate by a ram not shown into the wrapping device, whereupon the feeders 28 return into their initial position, shown in the drawings.

If during the stepwise movement of the pocket chain 19 the next pocket of the same, containing four tablets, is emptied by the feeders 28, a cam disc 40 (Fig. 10) is rotated in the direction of the arrow so that its toe 41 moves the rollers 42 in upward direction, which roller is arranged on the square rod 44 shiftable in stationary bearings 43, said rod in turn carrying the guide 31 for the rollers 30 of the two feeders 28, so that therefore the guide 31 and therefore the feeders 28, displaceable in the bearings 29, are lifted by the toe 41 such a distance, that the pockets 19 with the tablets t thereunder can move freely. If then the roller 42 again runs on the concentric portion of the toe cam 40 the guide 31 and the feeders 28 are lowered into the position shown.

The four tablets t are now brought from the plate 39 by a ram, not shown, in known manner onto the wrapping band 45, on which a tongs, also of known construction, have previously placed the wrapper 46, if necessary at the same time with a label thereunder (Fig. 12). The ram 47 presses the four tablets onto the wrapping band 45 and pulls this band downwards, the lever 48 actuated by a cam disc releasing on its oscillating to the left (Fig. 13) a sufficient length of band that the wrapper 46 is not displaced but always comes to rest on the same point. At the front end and at the rear end of carriage 49 a double armed lever 50 and an extension are provided, in each of which a rod-shaped roll 51 and 52 is rotatable. When pressing down the row of tablets t (Fig. 13) the roller 51 and the band 45 enclose the tablets, owing to the lever arm 50, and the ram 47 returns to the upper position. The lever 48 then tightens the band 45 and effects a partial wrapping of the tablets t with the wrapper 46 (Fig. 13). After the lever 48 has returned to its inoperative position, the carriage 49, actuated by a cam disc, is shifted in the direction of the arrow (Fig. 13) on the guide bar 53. Owing to this displacement the tablets enclosed in the band 45, held by the lever 48, rotate around their axis and the wrapper 46 is pressed tightly thereon and a perfect tight wrapping of the tablets is obtained.

During the displacement of the carriage 49 with the row of tablets and their wrapper 46, the lateral folding of the ends of the wrapper 46 is effected at the same time according to Fig. 14 by the two folding cheeks 54, known per se, each cheek being carried by a plate spring 55, in order to compensate within certain limits differences in length of the packings and to effect a correct lateral folding without danger of damaging particularly delicate packing material. Each plate spring 55 is held by a carrier 56, the downwardly bent arm 57 of which is adjustable in a bearing 58 of the wrapping device and can be secured by a screw 59, so that the folding cheeks 54 can be approached or moved apart according to the length of the articles to be packed.

As soon as the carriage 49 has arrived with the wrapped tablets under the catch plate 60, the lever arm 50 is returned by its actuating lever into the position shown in Fig. 12, the wrapping band 45 is slightly tightened by its pull spring 61 and the wrapped row of tablets is thereby brought against the catching plate 60, from whence it is delivered by means of an ejecting lever 62 actuated by a cam disc to a carrying off device of known type, provided with bands and serving at the same time for securing the adhesive seam.

If the articles to be wrapped are not cylindrical, but oval or multicornered, the pull spring 61 of the wrapping band 45 is slightly tightened, and a length of the band will be paid out during the rotation over the projections or corners of the article so that this band always bears tightly against the article.

According to Fig. 15, the guide rollers 63, 64 of comparatively large size are arranged over the guide rollers 51, 52 so that the winding band 45 is saved and has a longer life. The guide rollers 63, 64 also permit of a better winding of the inner end of the wrapping, as the winding band 45 encloses the row of tablets t practically on its entire circumference.

In the wrapping device, according to Figs. 18 and 19, the wrapping band is rigidly fastened on one side to the swing out lever 46 and yieldingly connected on the other side with roller 65, with weight pull 66, which may be replaced by a pull up spring inside the roller 65. This wrapping band 45 lies, when the individual parts are in their initial position, stretched by the weight pull over the two large guide rollers 67 and 68, each rotatably mounted in a double lever 69 on which the elbow levers 71 actuated by a rod 70, are hingedly connected.

The row of tablets $t$ to be wrapped lies on the wrapper 46 supplied to the wrapping band 45 (Fig. 18) and both are pressed by the descending ram into the wrapping band 45 between the guide rollers 67 and 68, the wrapping band being paid out by the roller 65 rotating in opposition to the weight pull 66, whereupon the ram 47 again rises and the guide rollers 67 and 68 approach each other, owing to the rising of rod 70 (Fig. 19). A wrapping loop has thus been formed in the wrapping band 45, which loop surrounds the row of tablets $t$ with the wrapper 46. The lever 48 is then swung out in the direction of the arrow (Fig. 19) such a distance, and so much band 45 is pulled by this lever over the stationary guide rollers 67 and 68, that the wrapper 46 is applied on its whole length around the tablets rotated by the band pull in the wrapping loop, and these tablets are wrapped in the wrapping 46.

During the rotation of the tablets $t$ in the wrapping loop the lateral folding of the wrapper is effected at the same time by the folding fingers 72 rotating periodically or continually in the direction of the arrow and arranged on each long side of the wrapping band 45, the first of said fingers producing the fold 46′ (Fig. 19) at the beginning of the wrapping operation whereas the other folds are produced by the next fingers 72.

When the wrapping of the tablets with the wrapper 46 has been completed, the guide rollers 67 and 68 return into their opened position, and the lever 48 returns into its initial position, and the band 45 again assumes its stretched horizontal position, owing to the weight-loaded roller 65, so that fresh tablets can be wrapped after those which have just been wrapped are brought out of the range of the ram 47.

On the known holder 73 (Fig. 16), controlled by a cam disc, the shank 74 of the ram 47 guided therein (Figs. 16 and 17) is adjustable in vertical direction by means of the screw 76 engaging through the slot 75 and adapted to be secured in its adjusted position. This holder can be lowered from the medium position shown for the pressing in of the tablets $t$ onto the wrapping band 45 and into the wrapping device for accommodating smaller tablets and raised for packing larger tablets.

Two dove-tailed guides are let in in longitudinal direction for the two guides 78 and 79 (Fig. 17) in the plates 77 of the ram 47 connected with the shank 74, the guide 78 being situated on part 80 and the guide 79 on the part 81. Both ram parts 80 and 81 are mutually adjustable towards the right and the left (Fig. 16) or towards the front and the rear (Fig. 17) owing to the slot guide 82 (Fig. 16) for the screw 83 adapted to be screwed into the part 81, so that the downwardly directed arms 84 and 85, arranged on the ram parts 80 and 81, grip between them a comparatively long row of tablets, as the parts 80 and 81 move apart and convey these tablets to the wrapping and labeling device.

Each of the arms 84 and 85 is oscillatably mounted in its suitably cut out ram part 80 or 81 respectively and held in the position shown or brought back into this position by a spiral pressure spring 86 (Fig. 16) situated in a cut out portion of its ram part. The arms 84 and 85 can therefore, when gliding with their inwardly directed extension 87 over the projecting edge of undercut tablets, swing outwardly, and the ram 47 can descend without damaging the edges of the two outer tablets, owing to the movement of the holder 73, so that the extensions 87 of the two arms 84 and 85 then press, owing to the action of the springs 86, against the undercut surface of the two outer tablets $t$ and hold same tightly together to enable them to be perfectly wrapped. The resilient oscillatable arms 84 and 85 compensate for any slight variations in length of the articles to be packed.

The folding fingers 72 shown in Fig. 19 are preferably also mutually adjustable and resiliently mounted on their axle like the folding cheeks 54 shown in Fig. 14.

I claim:—

1. In a machine for labeling and wrapping articles in combination, a device for spraying out and cleaning the articles to be wrapped, pairs of guide chutes for the rows of articles, means for supplying articles to one group of said guide chutes, supplying means for receiving articles from said guide chutes, a driving device adapted to impart a movement to said supplying means, feeders adapted to grip the articles being supplied, means for reciprocating said feeders, means for controlling the stepwise movement of said driving device and bringing these movements in cooperative relation with one another, lifting means for operating said feeders during the return movement, a wrapping device, and means for feeding the articles to said wrapping device.

2. In a machine for labeling and wrapping articles in combination an endless power driven band, flat elements attached parallel to each other on said band, upright supports for the articles on said band, an adjustable stripper for spraying out and cleaning the articles, pairs of guide brushes for straightening the articles, front guide chutes, means for directing the articles to said front guide chutes, back guide chutes for receiving articles in excess, a collector adapted to receive excess articles from said back chutes, supplying means for receiving articles in groups from said front guide chutes, a driving device for imparting a stepwise movement to said supplying means, feeders adapted to grip each group of articles and to shift same in lateral direction, means for reciprocating said feeders, means for lifting said feeders during their returning movement, and means for shifting articles to the wrapping arrangement.

3. A machine as specified in claim 1, comprising in combination with the supplying means, stepwise traveling pockets of said means adapted to the shape of the articles, a stationary plate arranged above said pockets, hingedly connected frames moved transversely to the travelling direction of said pockets and on said stationary plate, steps arranged towards the front side of said stationary plate in staggered positions according to the thickness of articles adapted to feed the articles into said pockets at different points simultaneously and at distances apart equal to the thickness of articles.

4. A machine as specified in claim 1, comprising in combination with the travelling pockets and guide chutes, a stationary plate above said pockets adapted to determine the positions of said pockets, supports for said pockets, a guide rail adapted to shift said pockets on their supports by the thickness of articles at each step of movement adapted to feed the articles from each of said chutes to a corresponding number of said pockets in positions determined by said stationary plate.

5. A machine as specified in claim 1, comprising in combination a wrapping band yieldingly held at one end, and an oscillatable lever rigidly holding said wrapping band at the other end, a slidable carriage, two guide rollers on said carriage adapted to support said band so that after having lowered a wrapper with articles together with said wrapping band into a locking position said wrapping band is slid over said guide rollers and rolls the wrapper round the articles as soon as said carriage is moved forward, means for laterally folding the wrapper, and carriers for said means mutually adjustable to any distance apart.

In testimony whereof I affix my signature.

REINHOLD HARTMANN.